US012092292B2

(12) United States Patent
Jeong et al.

(10) Patent No.: US 12,092,292 B2
(45) Date of Patent: Sep. 17, 2024

(54) PORTABLE AND MODULAR SOLAR-POWERED LIGHTING DEVICES

(71) Applicant: MPOWERD Inc., Brooklyn, NY (US)

(72) Inventors: Seungah Jeong, Brooklyn, NY (US); John Salzinger, Brooklyn, NY (US); Scott Klimcke, Brooklyn, NY (US); Juan S. Jacobo, Brooklyn, NY (US)

(73) Assignee: MPOWERD Inc., Brooklyn, NY (US)

( * ) Notice: Subject to any disclaimer, the term of this patent is extended or adjusted under 35 U.S.C. 154(b) by 0 days.

(21) Appl. No.: 17/968,699

(22) Filed: Oct. 18, 2022

(65) Prior Publication Data

US 2023/0120724 A1 Apr. 20, 2023

Related U.S. Application Data

(60) Provisional application No. 63/257,501, filed on Oct. 19, 2021.

(51) Int. Cl.
*F21S 9/03* (2006.01)
*F21V 23/06* (2006.01)
*F21Y 115/00* (2016.01)

(52) U.S. Cl.
CPC .............. *F21S 9/037* (2013.01); *F21V 23/06* (2013.01); *F21Y 2115/00* (2016.08)

(58) Field of Classification Search
CPC .......... F21S 9/037; F21V 23/06; F21V 5/006; F21V 7/0075; F21V 9/083; F21V 13/045; F21V 14/025; F21V 14/045; F21V 14/065; F21V 14/085; F21V 21/406; F21V 23/0414
See application file for complete search history.

(56) References Cited

U.S. PATENT DOCUMENTS

| | | | | |
|---|---|---|---|---|
| 2011/0075407 A1* | 3/2011 | Spartano | F21L 4/045 | 362/194 |
| 2015/0285449 A1* | 10/2015 | Hajee | F21S 9/037 | 362/183 |
| 2016/0197502 A1* | 7/2016 | Waters | F21L 4/085 | 362/183 |
| 2019/0360646 A1* | 11/2019 | Zhu | H03K 17/6871 | |
| 2021/0215333 A1* | 7/2021 | Eltorai | A44C 15/0015 | |
| 2022/0178522 A1* | 6/2022 | Cabot | F21V 21/0816 | |
| 2022/0194506 A1* | 6/2022 | Sparrow | F21V 23/06 | |
| 2022/0221115 A1* | 7/2022 | Hopkins | F21L 4/027 | |

* cited by examiner

*Primary Examiner* — Christopher E Dunay
(74) *Attorney, Agent, or Firm* — PEARL COHEN ZEDEK LATZER BARATZ LLP

(57) ABSTRACT

Modular and portable solar-powered lighting devices are described. The device may include a handle assembly including a rechargeable battery and a solar panel electrically connected to the rechargeable battery, a mounting assembly selectively attachable to the handle assembly, and a lighting assembly selectively attachable to the handle assembly, the lighting assembly including one or more light sources. The device may have a first configuration wherein the handle assembly is coupled to each of the lighting assembly and the mounting assembly; and a second configuration wherein the lighting assembly is attached to the mounting assembly and not coupled to the handle assembly. These configurations can resemble a flashlight and a headlamp, respectively.

16 Claims, 10 Drawing Sheets

PORTABLE AND MODULAR SOLAR-POWERED LIGHTING DEVICES

TECHNICAL FIELD

The present disclosure includes solar-powered lighting devices that are portable and are adaptable to serve numerous functions and/or provide for a variety of uses when assembled in various configurations.

BACKGROUND

Portable lighting devices have uses in a variety of situations, including during travel and in situations of limited or no power access. Examples include cases of natural disaster and other emergencies, remote or rural locations far from a power station or electricity grid, and developing countries that have limited and/or unreliable power. Yet, current lighting options are often short-lived, non-reusable or non-rechargeable, and/or impractical for use in multiple different settings and/or physical environments.

SUMMARY

The present disclosure includes a solar-powered lighting devices capable of being assembled in a variety of configurations for different uses. The solar-powered lighting devices herein may be useful in situations of intermittent access to electricity as a more stable and/or consistent source of light. The solar-powered lighting devices herein also may be more economical and/or portable than traditional grid-based lighting sources.

According to at least one example, a portable solar-powered lighting device includes a handle assembly including a rechargeable battery and a solar panel electrically connected to the rechargeable battery; a mounting assembly selectively attachable to a proximal end of the handle assembly; and a lighting assembly selectively attachable to a distal end of the handle assembly, the lighting assembly including at least one light source; wherein the device has a first configuration wherein the handle assembly is coupled to each of the lighting assembly and the mounting assembly, the lighting assembly being configured to emit light from the at least one light source using current generated by the solar panel and transferred to the lighting assembly via the rechargeable battery of the handle assembly while in the first configuration.

Any of the portable solar-powered lighting devices described herein may include any of the following features. The proximal end of the handle assembly includes a first engagement interface and a distal end of the mounting assembly includes a second engagement interface that mates with the first engagement interface for coupling the mounting assembly to the handle assembly in the first configuration. The distal end of the handle assembly includes a third engagement interface and a proximal end of the lighting assembly includes a fourth engagement interface that mates with the third engagement interface for coupling the lighting assembly to the handle assembly in the first configuration. The device has a second configuration wherein the proximal end of the lighting assembly is coupled to the distal end of the mounting assembly, and the handle assembly is unattached to the lighting assembly and the mounting assembly. The second engagement interface includes a mating feature complementary to a mating feature of each of the first engagement interface and the fourth engagement interface, the mating feature comprising at least one protrusion, aperture, or magnet. The third engagement interface and the fourth engagement interface include electrical contacts configured to electrically couple the handle assembly to the lighting assembly. The device includes a universal serial bus (USB) connector that is configured to couple an external electronic device to the rechargeable battery while the device is in the first configuration, to transfer power from the rechargeable battery to the external electronic device using current generated by the solar panel and stored in the rechargeable battery. The lighting assembly includes a rechargeable battery that is electrically coupled to the rechargeable battery of the handle assembly when the device is in the first configuration. The lighting assembly is configured to charge the rechargeable battery of the lighting assembly using current generated by the solar panel and stored in the rechargeable battery of the handle assembly when the device is in the first configuration. The handle assembly includes a first actuator and the lighting assembly includes a second actuator, each of the first actuator and the second actuator being configured to independently actuate the lighting assembly to emit light from the at least one light source using current generated by the solar panel when the device is in the first configuration. The lighting assembly includes an actuator configured to actuate the lighting assembly to emit light from the at least one light source using current stored in the rechargeable battery of the lighting device when the lighting assembly is detached from the handle assembly in a second configuration of the device. The mounting assembly includes at least one slot for receiving a fastening mechanism. The fastening mechanism includes a flexible strap configured to engage a body part of a user. A proximal end of the mounting assembly includes a padded surface configured to at least partially inhibit movement of the mounting assembly relative to the body part of the user. The at least one light source includes a plurality of light-emitting diodes (LEDs).

According to another example, a portable solar-powered lighting device includes a handle assembly extending from a proximal end to a distal end, the handle assembly including a rechargeable battery and a solar panel positioned along an exterior of the handle assembly, the solar panel being electrically connected to the rechargeable battery; a mounting assembly extending from a proximal end to a distal end, the distal end of the mounting assembly being selectively attachable to the proximal end of the handle assembly; and a lighting assembly extending from a proximal end to a distal end, the proximal end of the lighting assembly being selectively attachable to the distal end of the handle assembly, wherein the lighting assembly includes at least one light source configured to emit light through the distal end of the lighting assembly; wherein the device has a first configuration wherein the handle assembly is coupled to each of the lighting assembly and the mounting assembly, and the at least one light source is electrically coupled to the rechargeable battery of the handle assembly when the device is in the first configuration; wherein the lighting assembly emit lights from the at least one light source using current generated by the solar panel and stored in the rechargeable battery when the device is in the first configuration.

Any of the portable solar-powered lighting devices described herein may include any of the following features. The proximal end of the lighting assembly includes at least one protrusion complementary to an aperture of the distal end of the handle assembly and complementary to an aperture of the distal end of the mounting assembly. The device has a second configuration wherein the proximal end of the lighting device is coupled to the distal end of the mounting assembly, and the handle assembly is not coupled to either of the lighting device or the mounting device.

According to another example, a portable solar-powered lighting device includes a handle assembly including a rechargeable battery and a solar panel that is electrically connected to the rechargeable battery; a mounting assembly selectively attachable to the handle assembly, the mounting assembly coupled to a flexible strap; and a lighting assembly selectively attachable to the handle assembly, the lighting assembly including a rechargeable battery and at least one light source; wherein the device has a first configuration wherein the handle assembly is coupled to each of the lighting assembly and the mounting assembly, the lighting assembly being configured to emit light from the at least one light source using current generated by the solar panel and transferred to the lighting assembly via the rechargeable battery of the handle assembly; and wherein the device has a second configuration wherein the lighting assembly is coupled to the mounting assembly and not coupled to the handle assembly, the lighting assembly being configured to emit light from the at least one light source using current transferred to the lighting assembly via the rechargeable battery of the lighting assembly.

Any of the portable solar-powered lighting devices described herein may include any of the following features. The device has the form of a flashlight in the first configuration and the form of a headlamp in the second configuration.

BRIEF DESCRIPTION OF THE DRAWINGS

The accompanying drawings, which are incorporated in and constitute a part of this specification, illustrate various exemplary embodiments and together with the description, serve to explain the principles of the present disclosure.

DETAILED DESCRIPTION

Figure 1:
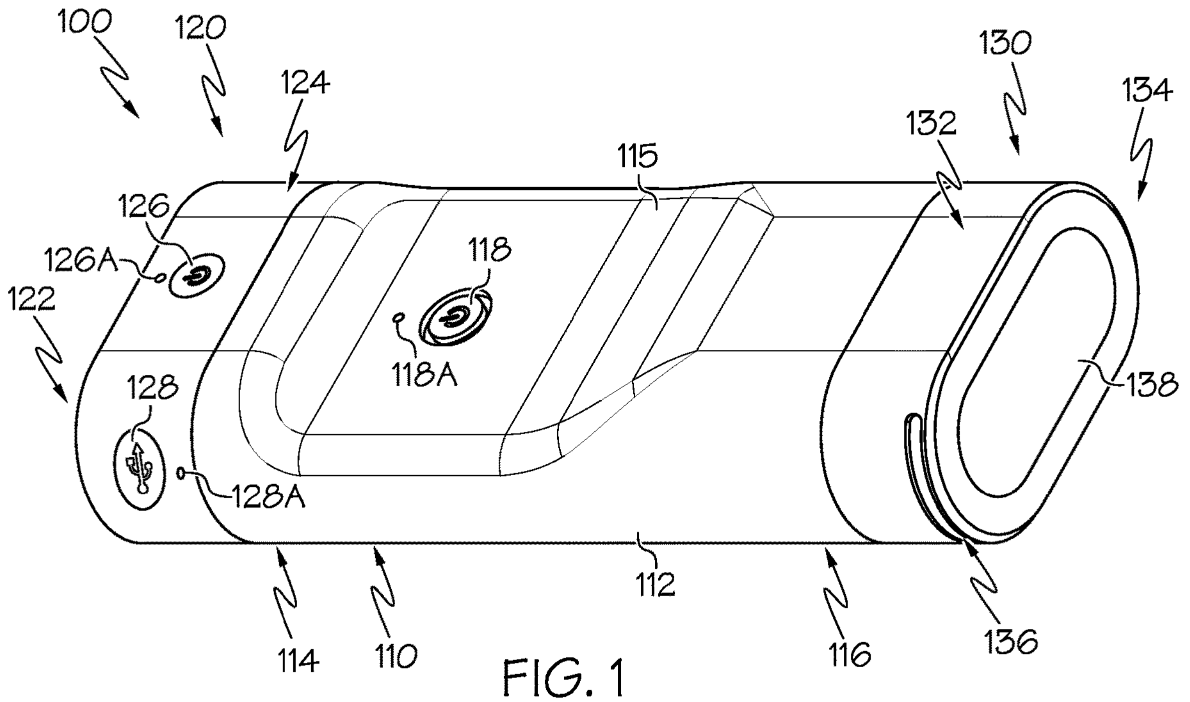
FIG. 1 shows a perspective view of an exemplary solar-powered lighting device, in accordance with some aspects of the present disclosure.

The terminology used in this disclosure may be interpreted in its broadest reasonable manner, even though it is being used in conjunction with a detailed description of certain specific examples of the present disclosure. Both the foregoing general description and the following detailed description are exemplary and explanatory only and are not restrictive of the features, as claimed.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. The terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "exemplary" is used in the sense of "example" rather than "ideal."

The present disclosure includes solar-powered lighting devices that are portable and adapted to assume different configurations for varying uses. For example, the lighting devices herein may include multiple components capable of assembly in a variety of configurations, e.g., for use in different types of environments or settings.

FIGS. 1-4 illustrate an exemplary solar-powered lighting device 100 in accordance with the present disclosure. The lighting device 100 may include a plurality of components or assemblies that may be selectively coupled to one another to provide for a plurality of configurations. The lighting device includes, for example, a handle assembly 110 (e.g. a first component), a lighting assembly 120 (e.g. a second component), and a mounting assembly 130 (e.g. a third component). As described herein, each of the assemblies of the lighting device 100 may include complementary engagement interfaces that are configured to selectively attach and detach to one or more other components/assemblies for transitioning the lighting device 100 between configurations.

The handle assembly 110 may include a body 112 having a longitudinal length defined between a distal end 114 and a proximal end 116. In some examples, the handle assembly 110 may be sized and shaped in the profile of a flashlight. As shown, for example, the body 112 may be generally cylindrical in shape with a generally oval or rectangular cross-section (e.g., rectangular with curved edges providing for a generally oval shape as shown). However, the body 112 may include various other suitable cross-sectional shapes such as, e.g., polygonal (triangular, square, pentagonal, etc.), circular, and more. Further, the cross-sectional shape and/or dimensions of the body 112 may vary. For example, the handle assembly 110 may have a substantially uniform cross-sectional dimension along the longitudinal length of the body 112 (e.g., a width and/or height at the distal end 114 that is equal or substantially equal to the respective width and/or height at the proximal end 116). In the example shown in FIG. 1, the body 112 has a tapered shape at least along a portion of the longitudinal length of the handle assembly 110 between the distal end 114 and the proximal end 116. In this instance, the cross-sectional dimension of the body 112 may vary and have one or more rounded corners or edges.

In an exemplary configuration such as the configuration shown in FIG. 1, the lighting device 100 (assembled from two or more components/assemblies) may be relatively compact and/or lightweight to facilitate portability and manipulability. For example, the lighting device 100 may have a total weight less than 12 ounces (e.g. about 340 grams), less than 10 ounces (e.g. about 283 grams), less than 8 ounces (e.g. about 227 grams), less than 6 ounces (e.g. about 170 grams), or less than 4 ounces (e.g. about 113 grams), e.g., a weight of 3 to 8 ounces, or 2 to 4 ounces. Further, the maximum cross-sectional dimension (e.g., the total length from proximal end 116 to distal end 114) of the lighting device 100 when in such configuration(s) (e.g., the configuration shown in FIG. 1) may be less than or equal to 12 inches, less than or equal to 10 inches, less than or equal to 6 inches, or less than or equal to 5 inches, e.g., from about 3 to 5 inches. Additionally or alternatively, the height of the lighting device 100 in such configuration(s) may be less than or equal to 4 inches, such as less than or equal to 3 inches, less than or equal to 1.5 inch, or less than or equal to 1 inch, such as from 0.5 to 2 inches, or from 1 to 1.5 inches.

Figure 2:
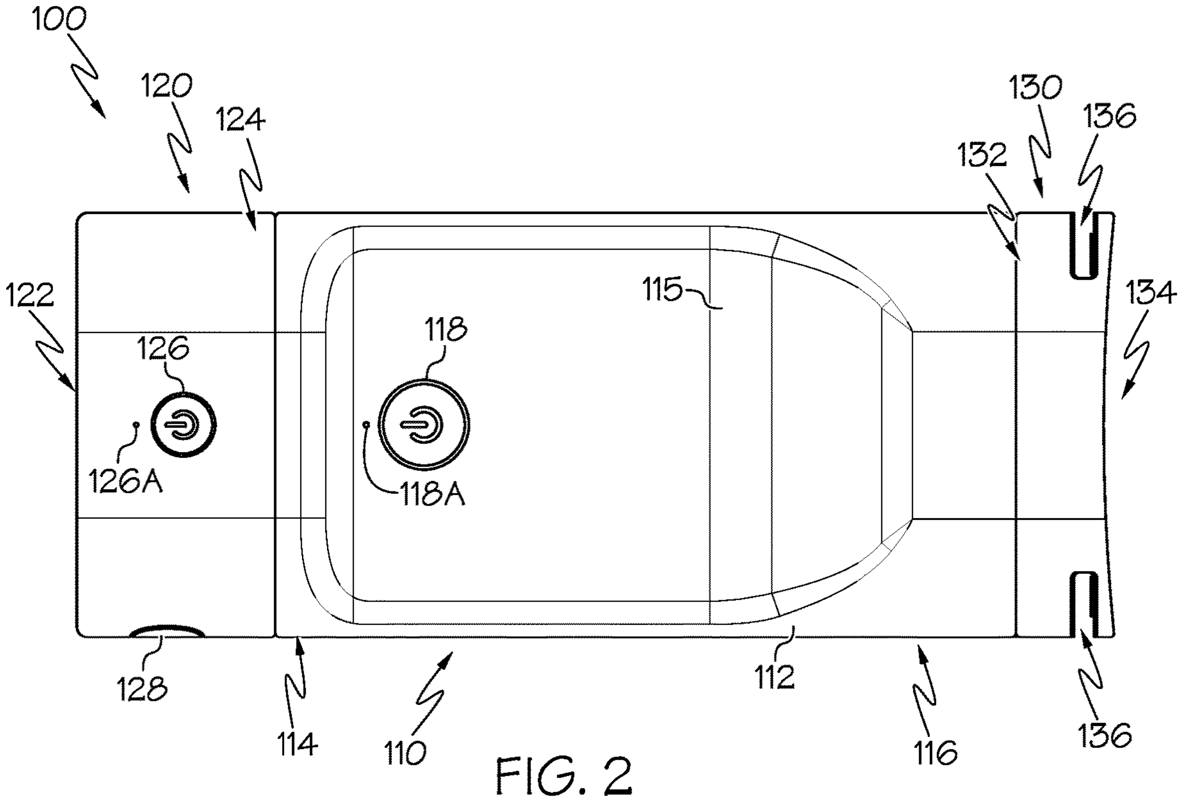
FIG. 2 shows a top view of the solar-powered lighting device of FIG. 1, in accordance with some aspects of the present disclosure.

Referring to FIGS. 1-2, the body 112 may be sized and shaped to have an ergonomic profile to facilitate grasping the handle assembly 110 during use of the lighting device 100. For example, the handle assembly 110 may include one or more recessed and/or curved surfaces along a first (top) wall of the body 112 that defines a user interface 115. The one or more recessed and/or curved surfaces may be sized and shaped to accommodate at least a portion of a user's hand (e.g., one or more fingers) on the user interface 115 for enhancing a grip and manual control of the handle assembly 110 (see also FIG. 13).

The one or more assemblies of the lighting device 100, including the handle assembly 110, the lighting assembly 120, and the mounting assembly 130, may comprise a housing comprising a polymer or combination of polymer materials, which may be selected to be durable. For example, one or more of the assemblies of the lighting device 100 may comprise acrylonitrile butadiene styrene (ABS), polypropylene, polyethylene, silicone, polyurethane, including thermoplastic polyurethane (TPU), polyvinylchloride (PVC), or a combination thereof. The housings of the assemblies may be crack-resistant and/or crack-proof. Further, the housings may be water resistant and/or waterproof, and in some embodiments, one or more of the assemblies may comprise frosted ABS plastic. Therefore, the lighting device 100 may be configured for use in various environmental conditions, e.g., suitable for indoor and outdoor use.

The body 112 of the handle assembly 110 may include at least one actuator 118 and at least one rechargeable battery disposed within the body 112. While FIGS. 1-2 depict one actuator 118, it is understood that the devices herein may include two or more actuators 118 to control different functions. The actuator(s) 118 may include a depressible button, a touchscreen display, a switch, a dial, and/or various other suitable input interfaces. For example, the actuator(s) 118 may include a power button that is operable to transfer electrical power stored in the rechargeable battery to electronic components of the handle assembly 110 and/or one or more other assemblies of the lighting device 100. For example, the actuator(s) 118 may allow a user to control the lighting assembly 120 when the handle assembly 110 is selectively coupled thereto. Further, the actuator(s) 118 may allow a user to select different operating modes of the lighting device 100, and/or to check the amount of power or charge remaining in the rechargeable battery. The actuator(s) 118 may optionally be indented or raised relative to the surrounding surface of the body 112 (e.g., indented or raised relative to the first (top) wall of the housing) to facilitate locating the actuator(s) 118 by touch.

The rechargeable battery may include a ferric or lithium ion battery. In some examples, the rechargeable battery may have a capacity ranging from about 100 mAh to about 3500 mAh, e.g., about 1500 mAh to about 3500 mAh, about 2000 mAh to about 3000 mAh, or about 3000 mAh to about 3500 mAh, e.g., about 200 mAh, about 250 mAh, about 300 mAh, about 350 mAh, about 400 mAh, about 450 mAh, about 500 mAh, about 550 mAh, about 600 mAh, about 1000 mAh, about 1500 mAh, about 2000 mAh, about 2500 mAh or about 3000 mAh. According to some examples herein, the capacity of the rechargeable battery may be sufficient to sustain a runtime of at least 6 hours, at least 12 hours, or at least 18 hours or more. In at least one example, the rechargeable battery has a capacity of 500 mAh and a runtime of about 12-16 hours on 15 lumens.

The handle assembly 110 may include one or more indicators. For example, the handle assembly 110 may include an indicator 118A positioned along the first (top) wall of the housing of the body 112, the indicator 118A providing information regarding the amount of power remaining in the rechargeable battery of the handle assembly 110. The indicator 118A may include one or more lights operably coupled to the rechargeable battery. The one or more lights may be LEDs, for example, and optionally may illuminate and/or display different colors based on different power levels. Thus, for example, a red light may indicate low power, a green light may indicate full charge or a substantially full charge, and a yellow light may indicate an intermediate amount of charge and power. In the example shown, the handle assembly 110 includes an indicator 118A (e.g., including a light such as an LED) positioned adjacent to the actuator 118. In other examples, the handle assembly 110 may include a plurality of indicators 118A, e.g., a plurality of lights that may be selectively illuminated to provide information as to the amount of power remaining in the rechargeable battery (e.g. the illumination of fewer indicator lights indicating lower amounts of power).

Still referring to FIGS. 1-2, the lighting assembly 120 may include a body having a longitudinal length defined between a distal end 122 and a proximal end 124. The proximal end 124 may be sized, shaped, and configured to selectively engage the distal end 114 of the handle assembly 110, thereby coupling the lighting assembly 120 to the handle assembly 110. Accordingly, upon coupling the lighting assembly 120 to the handle assembly 110, a user of lighting device 100 may control a relative position and/or orientation of the lighting assembly 120 upon a corresponding movement of the handle assembly 110, and vice versa. As described in further detail below, the direction of a light beam generated by the lighting assembly 120 may be controlled by selectively maneuvering the handle assembly 110 via the user interface 115.

The lighting assembly 120 may include at least one actuator 126 and at least one electronic connector 128 positioned along the body of the lighting assembly 120. In the example shown, the actuator 126 is positioned along a first (top) wall of the housing of the lighting assembly 120, and the electronic connector 128 is positioned along a sidewall of the housing of the lighting assembly 120. The actuator 126 may be configured for receiving and transmitting user input. For example, the actuator 126 may include a depressible button, a touchscreen display, a switch, a dial, and/or various other suitable input interfaces.

Figure 5:
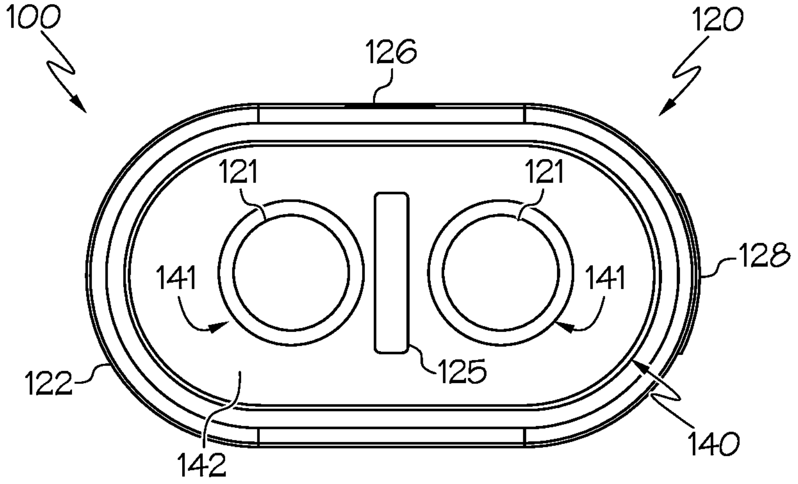
FIG. 5 shows a front view of the solar-powered lighting device of FIG. 1, in accordance with some aspects of the present disclosure.

The lighting assembly 120 may further include at least one rechargeable battery disposed within the body of the lighting assembly 120. In the example shown, the actuator 126 includes an actuator in the form of a power button that is operable to receive user input and transfer electrical power stored in the rechargeable battery of the lighting assembly 120 upon actuation. In other examples, the actuator 126 may be operable to receive user input and transfer electrical power stored in the rechargeable battery of the handle assembly 110 upon actuation, when the lighting assembly 120 is coupled to the handle assembly 110. The actuator 126 may be configured to actuate one or more components (e.g., electronic components) of the lighting assembly 120, such as, for example, one or more light sources 121 (FIG. 5).

Still referring to FIGS. 1-2, the lighting assembly 120 may include one or more feedback indicators on the body of the lighting assembly 120. For example, the lighting assembly 120 may include an indicator 126A positioned along the first (top) wall of the body housing that provides information regarding the amount of power remaining in the rechargeable battery of the lighting assembly 120. The indicator 126A may include one or more lights operably coupled to the rechargeable battery. The indicator light(s) may be LEDs, for example, and optionally may illuminate and/or display different colors based on different power levels. Thus, for example, a red light may indicate low power, a green light may indicate full charge or a substantially full charge, and a yellow light may indicate an intermediate amount of power and charge. In the example shown, the lighting assembly 120 includes one indicator 126A positioned adjacent to the actuator 126. In other examples, the lighting assembly 120 may include a plurality of indicators 126A (e.g., a plurality of lights such as LEDs) that may be selectively illuminated to provide information as to the amount of power remaining in the rechargeable battery of the lighting assembly 120 (e.g. the illumination of fewer indicator lights indicating lower amounts of power).

Figure 4:
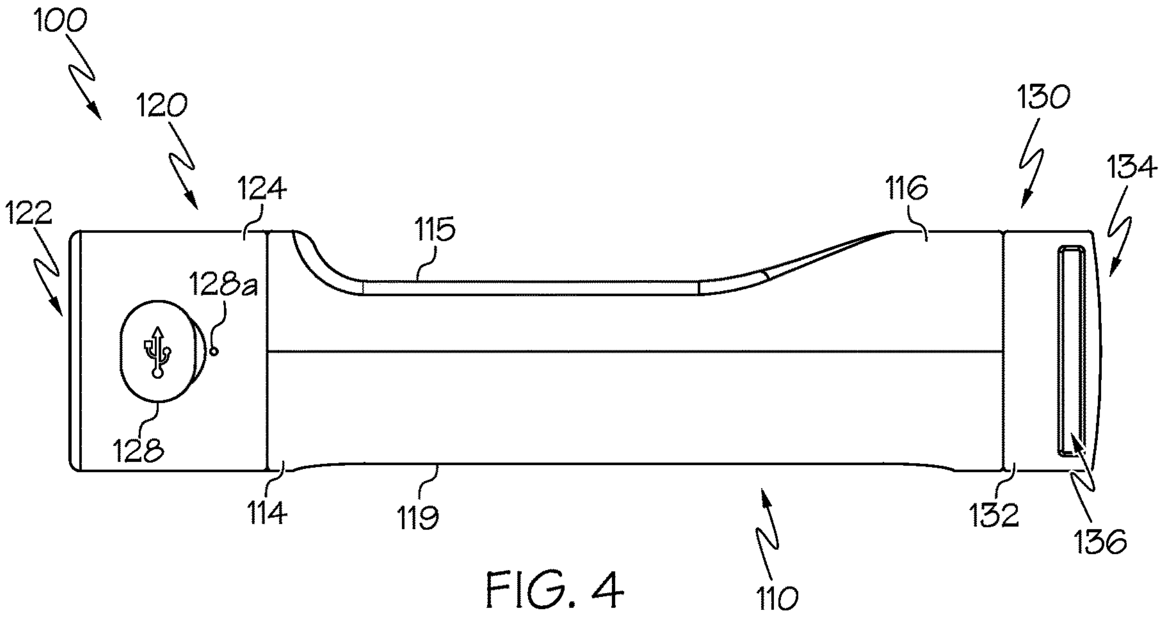
FIG. 4 shows a side view of the solar-powered lighting device of FIG. 1, in accordance with some aspects of the present disclosure.

The electronic connector 128 may include a universal serial bus (USB) connector that is configured to couple an external electronic device (e.g., a smartphone or other mobile device) to the lighting assembly 120, such as, for example, via a cable. For example, the electronic connector 128 may include a USB port or USB-type port (including, e.g., micro-USB port). As best seen in FIG. 4, the electronic connector 128 may include a movable cover coupled to a port of the electronic connector 128 for enclosing the port of the electronic connector 128. The movable cover may be configured to seal the port of the electronic connector 128 when not in use, and may be selectively removable from the body of the lighting assembly 120 to facilitate access to the port for electrically coupling the external electronic device to the lighting assembly 120.

The electronic connector 128 may be configured to allow for charging and/or powering of an external electronic device coupled to the lighting assembly 120, such as from the rechargeable battery of the lighting assembly 120, and/or of the rechargeable battery of the handle assembly 110 when coupled thereto. As described in further detail herein, the lighting assembly 120 may be configured to transfer power to the external electronic device using current generated by the solar panel 119 of the handle assembly 110 and stored in the rechargeable battery of the handle assembly 110, when the lighting assembly 120 is coupled to the handle assembly 110.

Referring to FIGS. 1 and 4, the lighting assembly 120 may further include one or more feedback indicators corresponding to the electronic connector 128. For example, the lighting assembly 120 may include an indicator 128A positioned along the housing, e.g., along the sidewall of the body of lighting assembly 120, wherein the indicator 128A provides information regarding the amount of power remaining in a battery of the external electronic device coupled to the lighting assembly 120 via the electronic connector 128. The indicator 128A may configured and operable similar to the indicators 118A, 126A shown and described above.

Referring back to FIGS. 1-2, the mounting assembly 130 may include a body having a longitudinal length defined between a distal end 132 and a proximal end 134. The distal end 132 may be sized, shaped, and configured to selectively engage the proximal end 116 of the handle assembly 110, thereby coupling the mounting assembly 130 to the handle assembly 110. The mounting assembly 130 may include one or more slots 136 extending through the body at the proximal end 134. The one or more slots 136 may be configured to receive a fastening mechanism therethrough. For example, the one or more slots 136 may be sized and shaped to receive a fastening mechanism for securing the mounting assembly 130 to a user (see FIGS. 11-14).

Figure 13:
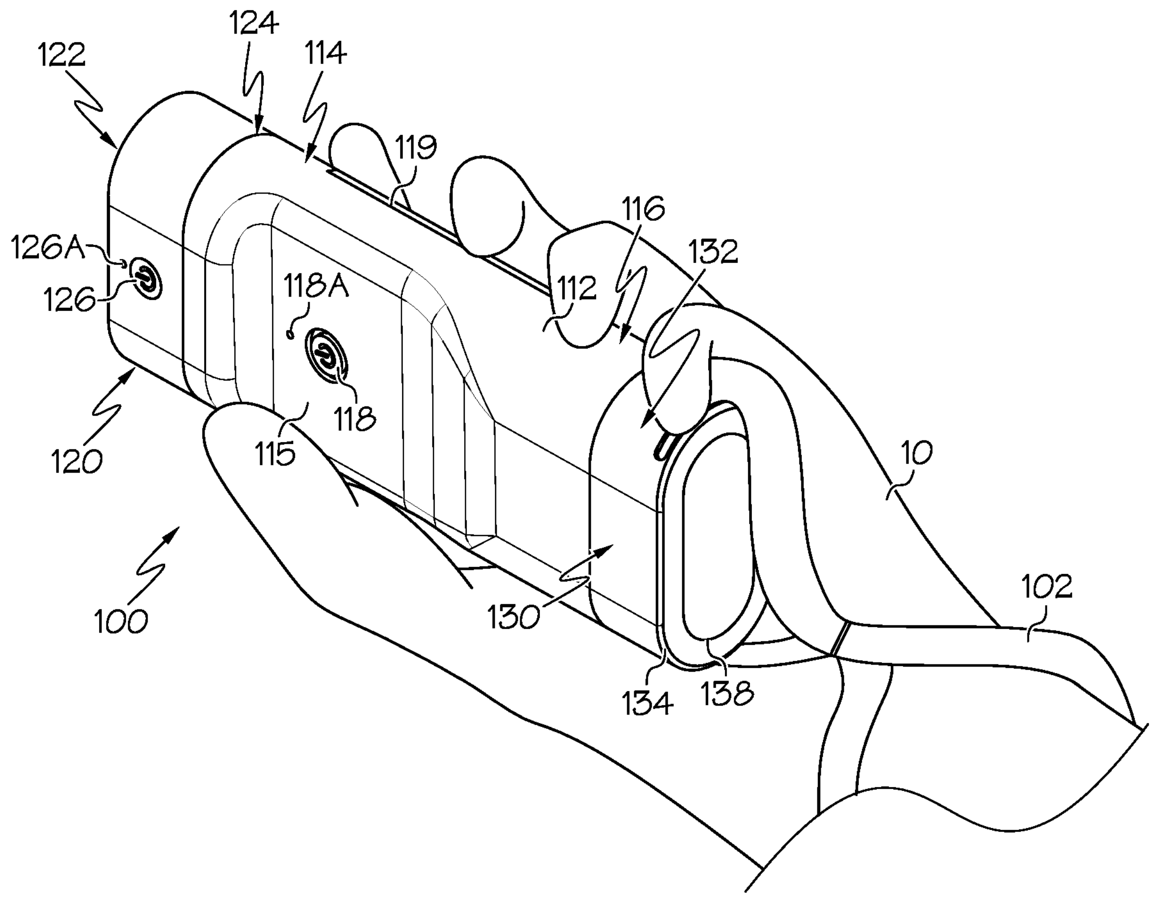
FIG. 13 shows a perspective view of the solar-powered lighting device of FIG. 1 in a configuration useful as a flashlight, in accordance with some aspects of the present disclosure.
Figure 14:
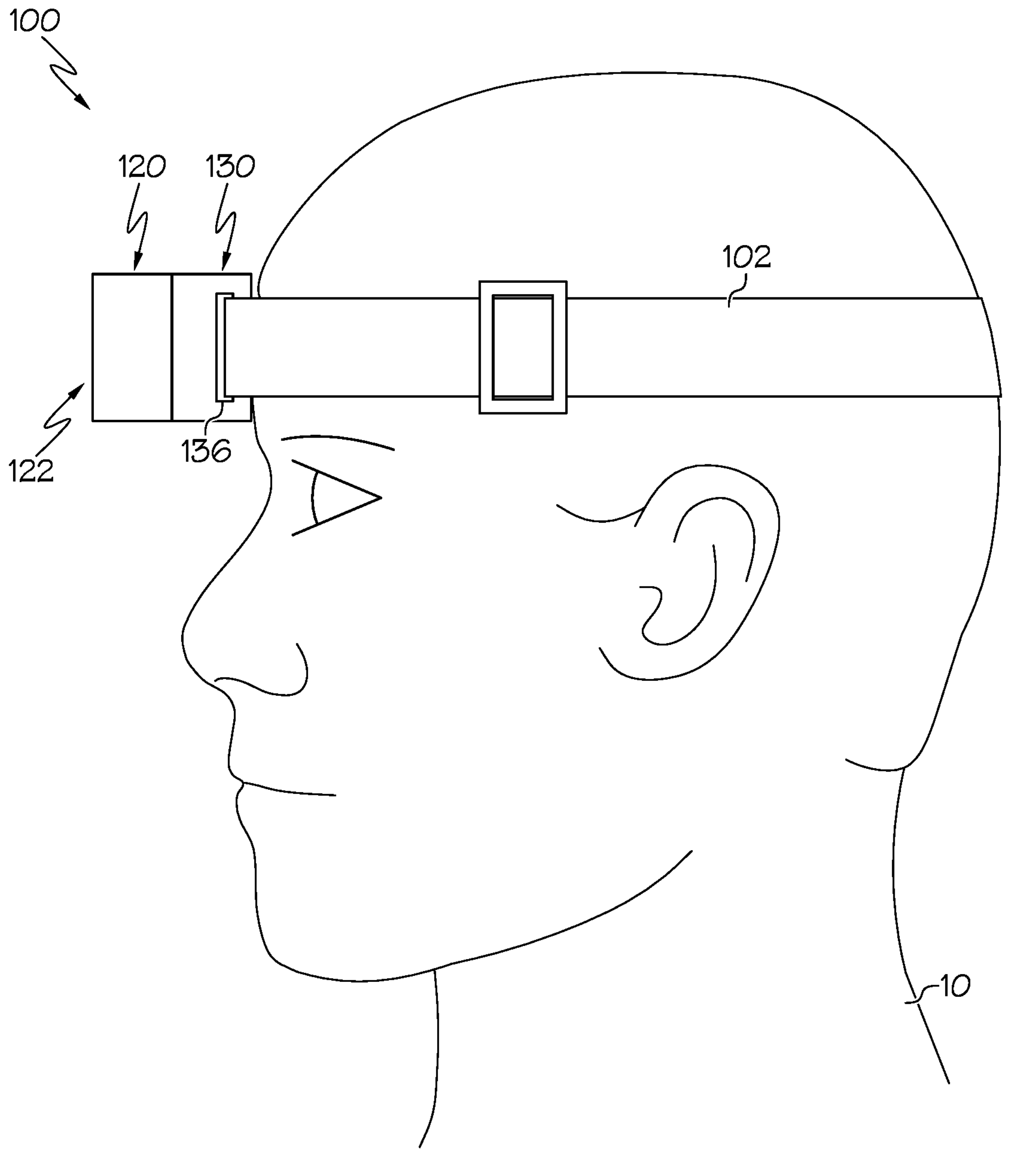
FIG. 14 shows a side view of the solar-powered lighting device of FIG. 1 in a configuration useful as a headlamp, in accordance with some aspects of the present disclosure.

The fastening mechanism may include, but is not limited to, an adjustable strap insertable through the one or more slots 136, and configured to engage a body part (e.g. hand, wrist, head, etc.) of the user (see FIGS. 13-14). Accordingly, upon coupling the handle assembly 110 to the mounting assembly 130, with the lighting assembly 120 further coupled to the handle assembly 110, a user of lighting device 100 may suspend, store, maintain, and/or position the lighting assembly 120 and the handle assembly 110 relative to the user by attaching the mounting assembly 130 to the user via the fastening mechanism. As further described below, the direction of a light beam generated by the lighting assembly 120 may be controlled by selectively maneuvering the handle assembly 110 and/or the mounting assembly 130, depending on a configuration of the lighting device 100.

Figure 3:
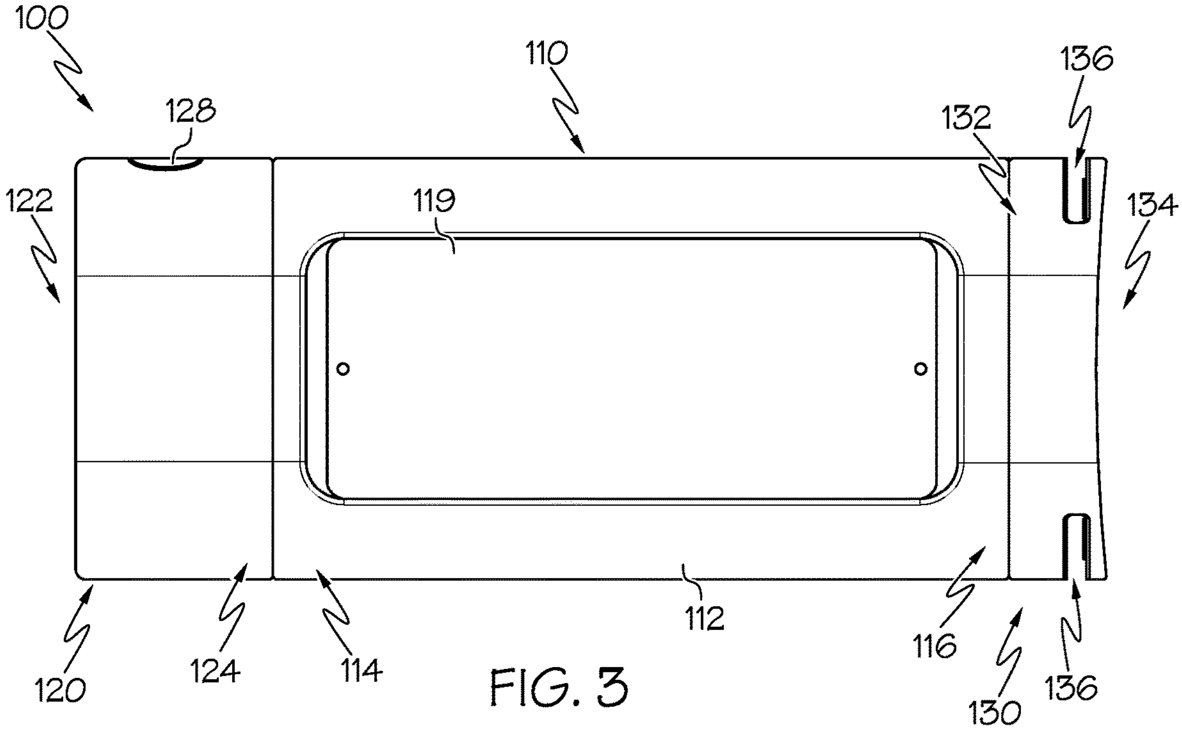
FIG. 3 shows a bottom view the solar-powered lighting device of FIG. 1, in accordance with some aspects of the present disclosure.

Referring now to FIG. 3, the handle assembly 110 may further include a solar panel 119 positioned along the housing of the body 112 between the distal end 114 and the proximal end 116. In the example shown, the solar panel 119 is positioned along a second (bottom) wall of the body 112 that is opposite of the user interface 115 on the first (top) wall of the body 112. The solar panel 119 may be coupled to or integrated into an outer surface of the housing of the body 112 so as to allow for exposure to natural and/or artificial light. The solar panel 119 may comprise silicon, e.g., monocrystalline or polycrystalline silicon. In some embodiments, the solar panel 119 may fit within a recessed area (e.g., within a recessed area or aperture on the second wall of the body 112) to allow for an electronic connection to internal components of the handle assembly 110, such that the solar panel 119 is substantially flush with the surrounding surface of the housing of the body 112.

The solar panel 119 may be backed by a support material, such as polycarbonate or another plastic or polymer. Alternatively, the solar panel 119 may be in direct contact with the material(s) of the housing of the body 112 of the handle assembly 110. The surface of the solar panel 119 may include a protective film or resin to protect against damage and/or exposure to contaminants. In the example shown, the solar panel 119 extends along a substantial portion of the longitudinal length of the body 112. In other examples, the solar panel 119 may have various other suitable sizes and/or shapes without departing from a scope of this disclosure.

Still referring to FIG. 3, the solar panel 119 may be operably coupled to, that is, in electronic communication with, one or more electronic components within the body 112, such as the rechargeable battery of the handle assembly 110. Accordingly, the solar panel 119 may be electrically coupled to and configured to recharge the rechargeable battery of the handle assembly 110. In some examples, the solar panel 119 may charge the rechargeable battery in less than 24 hours, less than 18 hours, less than 12 hours, or less than 6 hours, such as from about 2 hours to about 15 hours, or from about 6 hours to about 12 hours. Additionally, the solar panel 119 may be electrically coupled to the rechargeable battery of the lighting assembly 120 when the handle assembly 110 is coupled thereto, such that the solar panel 119 may be operable to charge the rechargeable battery of the lighting assembly 120. In some embodiments, upon coupling an external electronic device to the lighting assembly 120 via the electronic connector 128, the solar panel 119 may be operable to charge the external electronic device, such as via the rechargeable batteries of the handle assembly 110 and the lighting assembly 120.

Referring now to FIG. 5, the distal end 122 of the lighting assembly 120 may include one or more light sources 121. In the example shown, the lighting assembly 120 includes a plurality of light sources 121 facing distally from the distal end 112. Stated differently, the plurality of light sources 121 may be positioned on the distal end 122 to emit light distally relative to the lighting device 100 (e.g. in a direction outward from the distal end 122). The light sources 121 may comprise light-emitting diodes (LEDs), for example. The plurality of light sources 121 (e.g. LEDs) may be configured to emit white light and/or various colors of light, such as red, blue, green, etc. The light sources 121 herein may include a single LED or a plurality of LEDs, e.g., two, three, four, five, six, or more LEDs. For example, the light sources 121 may include two LEDs, such as, at least one white LED and at least one colored LED. The LEDs may provide an amount of light of about 10 lumens to about 500 lumens, such as about 15 lumens, about 25 lumens, about 30 lumens, about 35 lumens, about 40 lumens, about 45 lumens, about 50 lumens, about 55 lumens, about 60 lumens, about 75 lumens, about 100 lumens, about 200 lumens, about 250 lumens, about 300 lumens, or about 400 lumens.

The LEDs may be operated in different operating modes, such as varying levels of intensity, on/off flashing or other patterns, and/or different colors. The different operating modes may be stored and controlled by a microprocessor within the body of the lighting assembly 120. For example, the LEDs may be operated at different levels of intensity, such as low (such as about 10-40 lumens, e.g., 15 lumens), medium (such as about 50-125 lumens, e.g., 100 lumens), and/or high (such as about 150-300 lumens, e.g., 200 lumens). In some examples, the power stored in the rechargeable battery of the handle assembly 110 may allow the LEDs on the lighting assembly 120 to operate at a high intensity (e.g., about 300 lumens) for about 4 hours, a medium intensity (e.g., about 100 lumens) for about 12 hours, and a low intensity (e.g., about 10 lumens) for about 30 hours when the lighting device 100 is in a first configuration in the form of a flashlight. In further examples, the power stored in the rechargeable battery of the lighting assembly 120 may allow the LEDs to operate at a high intensity (e.g., about 300 lumens) for about 2 hours, a medium intensity (e.g., about 100 lumens) for about 6 hours, and a low intensity (e.g., about 10 lumens) for about 24 hours when the lighting device 100 is in a second configuration in the form of a headlamp. Additionally or alternatively, the LEDs may be operated in different patterns, such as flashing (e.g., on/off, such as at a low, medium, or high intensity). Further, for example, the LEDs may maintain a selected color, such as a steady red light (e.g., at a low, medium, or high intensity).

A user may be able to power the light source(s) (e.g., LEDs) on/off and/or select different operating modes via the actuator 126 of the lighting assembly 120. In at least one example, a first selection (e.g., press of a button) of the actuator 126 may be configured to turn the light source(s) 121 on a low intensity setting, a second selection of the actuator 126 may be configured to increase the intensity to a medium setting, a third selection may increase the intensity to a high setting, a fourth selection may initiate a flashing mode (e.g., 1 second on/off), and a fifth selection may initiate a steady color mode, such as a steady red light. Additional selection(s) of the actuator 126 may turn the light source(s) 121 off or initiate other operating modes of the light source(s) 121. In some embodiments, the microprocessor configured to store and control the different operating modes of the plurality of light source(s) 121 may be within any of the assemblies of the lighting device 100 (e.g. the lighting assembly 120 or the handle assembly 110).

Still referring to FIG. 5, the lighting assembly 120 may further include a panel 140 coupled to the distal end 122, thereby concealing the light source(s) 121 between the panel 140 and the distal end 122. The panel 140 may include a body 142 with at least one aperture 141 corresponding to each of the light source(s) 121 on the distal end 122. In some embodiments, the lighting assembly 120 may include one or more second light sources 125 (different in shape and/or size from the (first) light source(s) 121) on the distal end 122. The one or more second light sources 125 may be configured and operable similar to the light sources 121 described above.

In the example shown, the lighting assembly 120 includes a second light source 125 that has a size and/or shape that varies relative to the two (first) light sources 121 depicted. Further, the second light source 125 may be positioned in alignment with the body 142 of the panel 140, and the body 142 may be at least partially transparent or translucent to allow light emitted from the second light source 125 to pass through the panel 140. In some examples, at least a portion of the body 142 may be reflective or otherwise include one or more reflective surfaces to promote diffusion of the light emitted by the second light source 125.

In some examples, the panel 140 may comprise frosted ABS to allow for diffusion of light. Additional polymers and other suitable materials including glass (e.g., glass with shatter resistance) are also contemplated and encompassed herein. The material(s) used to form the body 142 may allow for even dispersion of light. In some examples, the panel 140 may allow for a diffuse lighting pattern, e.g., such that the light is emitted from the distal end 122 at angles or in an arc to provide diffuse room lighting. According to some aspects of the present disclosure, the panel 140 may provide for a more focused beam of light through the aperture(s) 141, e.g. by the light source(s) 121. The panel 140 may be coupled to the distal end 122 of the lighting assembly 120 by any suitable mating feature or other mechanism (e.g. tabs, clips, snap-fit connection, etc.). In an example, the panel 140 may be fixedly attached to the distal end 122 to provide for a water resistant and/or waterproof connection with one another.

Figure 6:
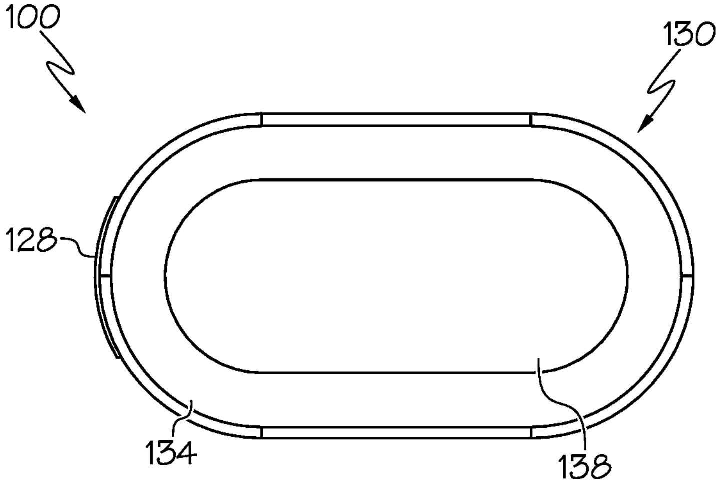
FIG. 6 shows a rear view of the solar-powered lighting device of FIG. 1, in accordance with some aspects of the present disclosure.

Referring to FIG. 6, the proximal end 134 of the mounting assembly 130 may include an interface surface 138. The interface surface 138 may be positioned along an exterior of the proximal end 134, and configured to abut against at least a portion of a user's body during use of the lighting device 100. In some examples, the interface surface 138 may be formed of a malleable and/or bendable or flexible material. Optionally, the mounting assembly 130 may include a pad and/or cushion along at least a portion of the interface surface 138 to promote user comfort when received against the user's body during use of the lighting device 100. The interface surface 138 may be further configured to provide a frictional resistance against the user's body to inhibit movement of the lighting device 100 when abutting against the user's body. In some examples, the interface surface 138 may include one or more features for enhancing a comfort and/or resistance with the user's body, such as, for example, one or more of a raised edge, protrusion(s), recesses, and/or other surface features. The proximal end 134 and/or the interface surface 138 may be sized and shaped to facilitate engagement with the user's body during use of the lighting device 100. For example, the proximal end 134 and/or the interface surface 138 may have a curved profile to promote engagement of the mounting assembly 130 against the user's body, such as with the user's wrist, hand, head, etc.

Figure 7A:
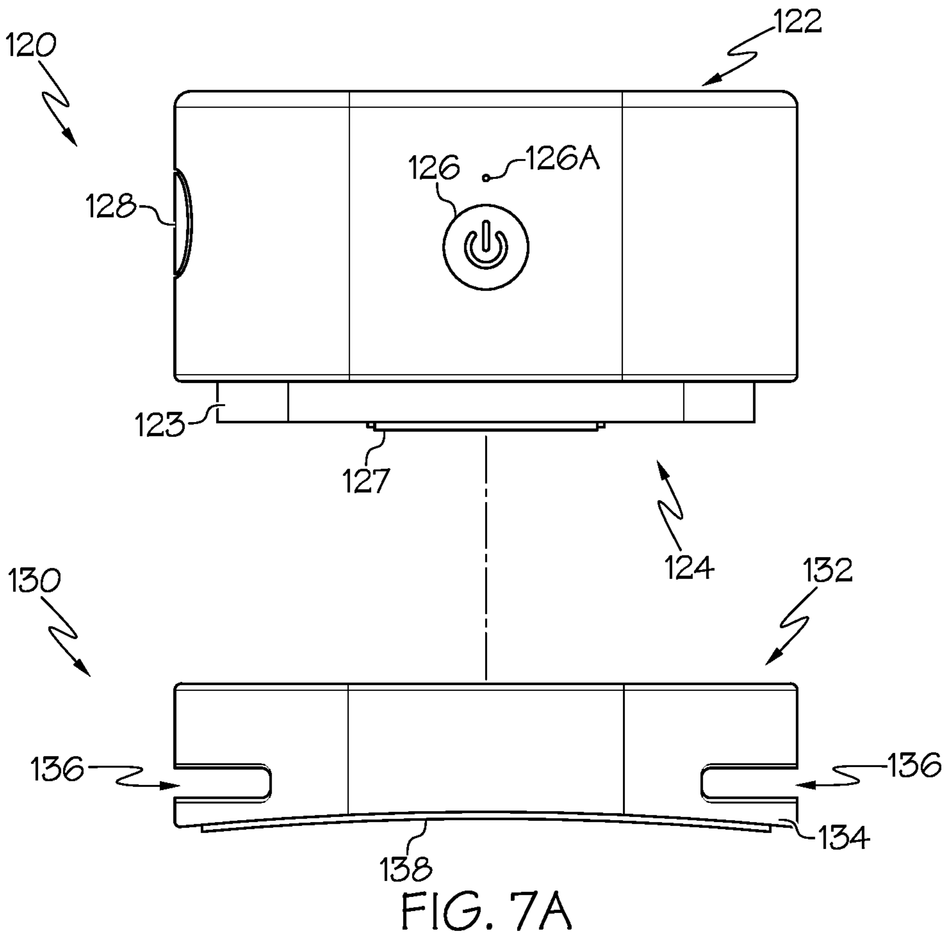
FIGS. 7A and 7B show a top view of a lighting assembly and a mounting assembly of the solar-powered lighting device of FIG. 1, in accordance with some aspects of the present disclosure.

As mentioned above, the lighting device 100 may have a configuration in which the handle assembly 110, the lighting assembly 120, and the mounting assembly 130 are coupled to one another (see FIGS. 1-4), and another configuration in which one or more of the assemblies are decoupled from one another. As seen in FIG. 7A, the handle assembly 110 may be decoupled from the lighting assembly 120 and the mounting assembly 130. The lighting assembly 120 may include an engagement interface along the proximal end 124 and the mounting assembly 130 may include a corresponding engagement interface on the distal end 132 that is configured to mate with the engagement interface of the lighting assembly 120.

Figure 8:
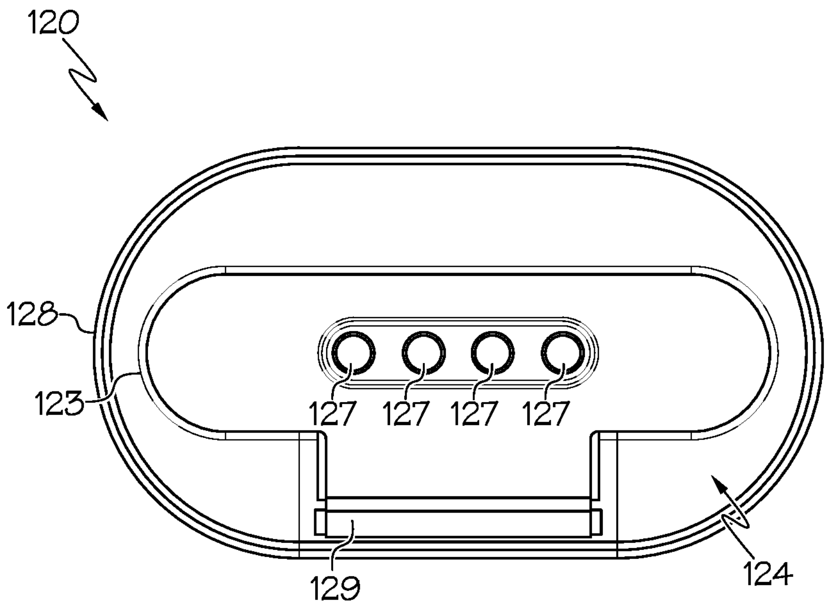
FIG. 8 shows a rear view of a lighting assembly of the solar-powered lighting device of FIG. 1, in accordance with some aspects of the present disclosure.
Figure 9:
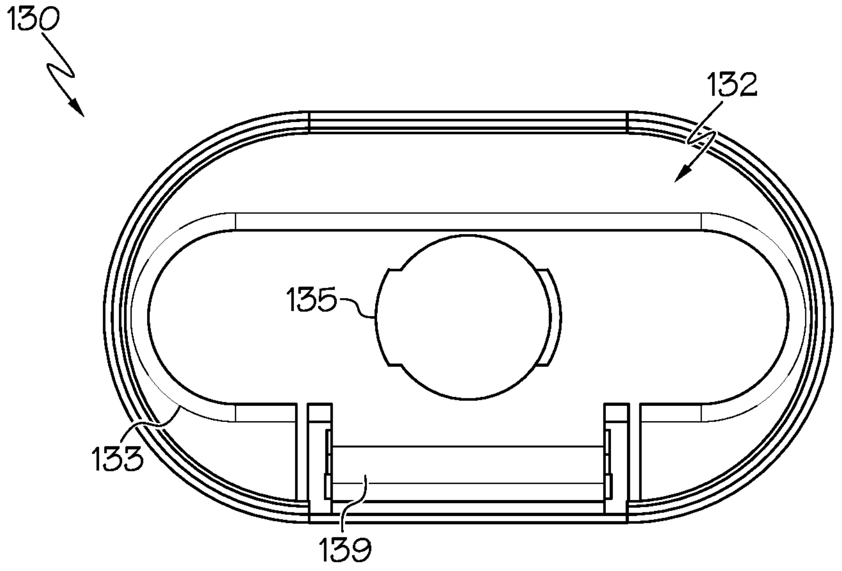
FIG. 9 shows a front view of a mounting assembly of the solar-powered lighting device of FIG. 1, in accordance with some aspects of the present disclosure.

For example, the lighting assembly 120 may include a portion complementary to the mounting assembly 130. The portion may be, for example, an extension 123 extending proximally outward from the body of the lighting assembly 120 at the proximal end 124. As best seen in FIG. 8, the extension 123 may be sized and/or shaped to be complementary to a corresponding engagement interface of the mounting assembly 130. As shown in FIG. 9, the mounting assembly 130 may include an aperture 133 along the distal end 132 that is sized and/or shaped in accordance with the configuration of the extension 123, such that the aperture 133 is configured to receive the extension 123. For example, the aperture 133 may have a cross-sectional dimension (e.g., diameter) that is greater than a cross-sectional dimension (e.g., diameter) of the extension 123.

Referring to FIG. 8, the engagement interface of the lighting assembly 120 may include additional features for facilitating an engagement of the proximal end 124 with the mounting assembly 130. For example, the lighting assembly 120 may include a protrusion 129 configured to mate with a recess 139 on the mounting assembly 130, as shown in FIG. 9. The recess 139 may be positioned relative to the distal end 132 to align with the protrusion 129 when the lighting assembly 120 is coupled to the mounting assembly 130. In further examples, the lighting assembly 120 and the mounting assembly 130 may include additional features along the respective engagement interfaces for facilitating an engagement between the assemblies, such as, for example, one or more magnets, adhesives, tabs, clips, threads, and/or other suitable mechanisms.

Figure 7B:
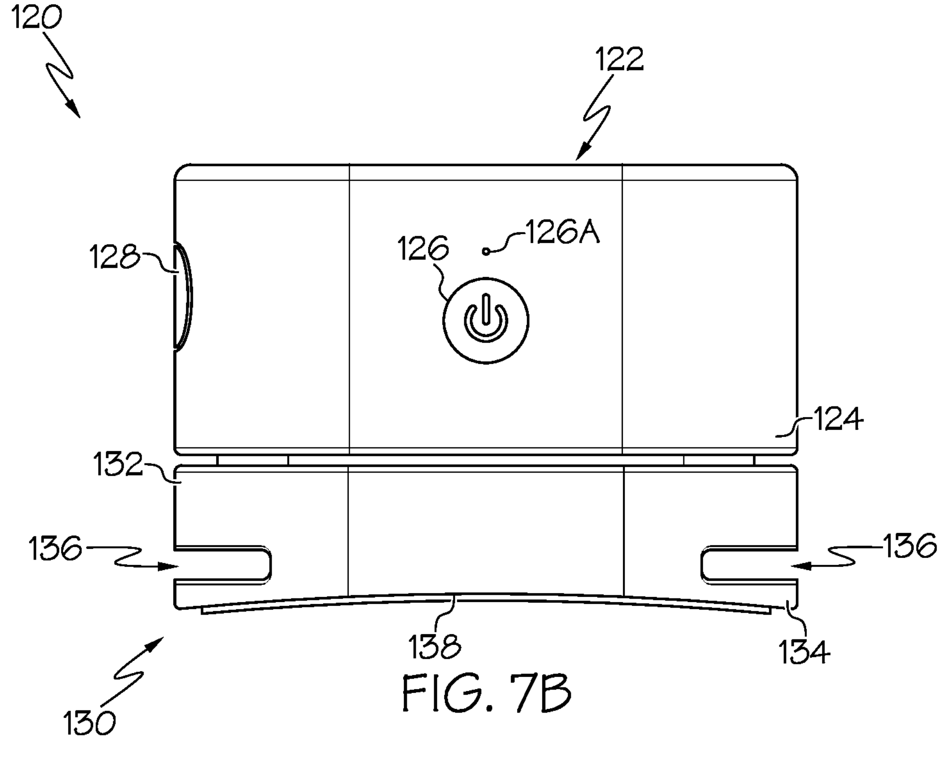

As seen in FIG. 7B, mating the engagement interface at the proximal end 124 of the lighting assembly 120 with the engagement interface at the distal end 132 of the mounting assembly 130, may couple the lighting assembly 120 to the mounting assembly 130. With the lighting device 100 transition from a first configuration (FIGS. 1-4) to a second configuration (FIG. 7B), the lighting device 100 may be utilized without the handle assembly 110, wherein the lighting assembly 120 is attached directly to the mounting assembly 130. The engagement interfaces of the lighting assembly 120 and the mounting assembly 130 may be securely attached to one another to provide for a water resistant or waterproof interface when assembled. As described below, the lighting device 100 may be suspended from or otherwise secured to a portion of the user's body (e.g., head) when in the second configuration (see FIG. 14).

As seen in FIG. 9, the engagement interface of the mounting assembly 130 may include one or more additional features for facilitating an engagement with the lighting assembly 120 and/or the handle assembly 110. For example, the mounting assembly 130 optionally may include a second aperture 135 on the proximal end 134. The second aperture 135 may be formed within the (first) aperture 133 such that the second aperture 135 may be accessible from the distal end 132 through the (first) aperture 133. The second aperture 135 may be sized, shaped, and configured to mate with an engagement interface of the handle assembly 110 to facilitate attachment of the mounting assembly thereto. Additionally or alternatively, the mounting assembly 130 may include one or more magnets configured to mate with corresponding magnet(s) of the lighting assembly 120 and/or of the handle assembly 110. For example, the mounting assembly 130 may include one or more magnets (in lieu of, or in addition to, the first aperture 133 and/or second aperture 135) complementary to one or more magnets of the proximal end 124 of the lighting assembly 120 and/or one or more magnets of the proximal end 116 of the handle assembly 110.

Figure 10:
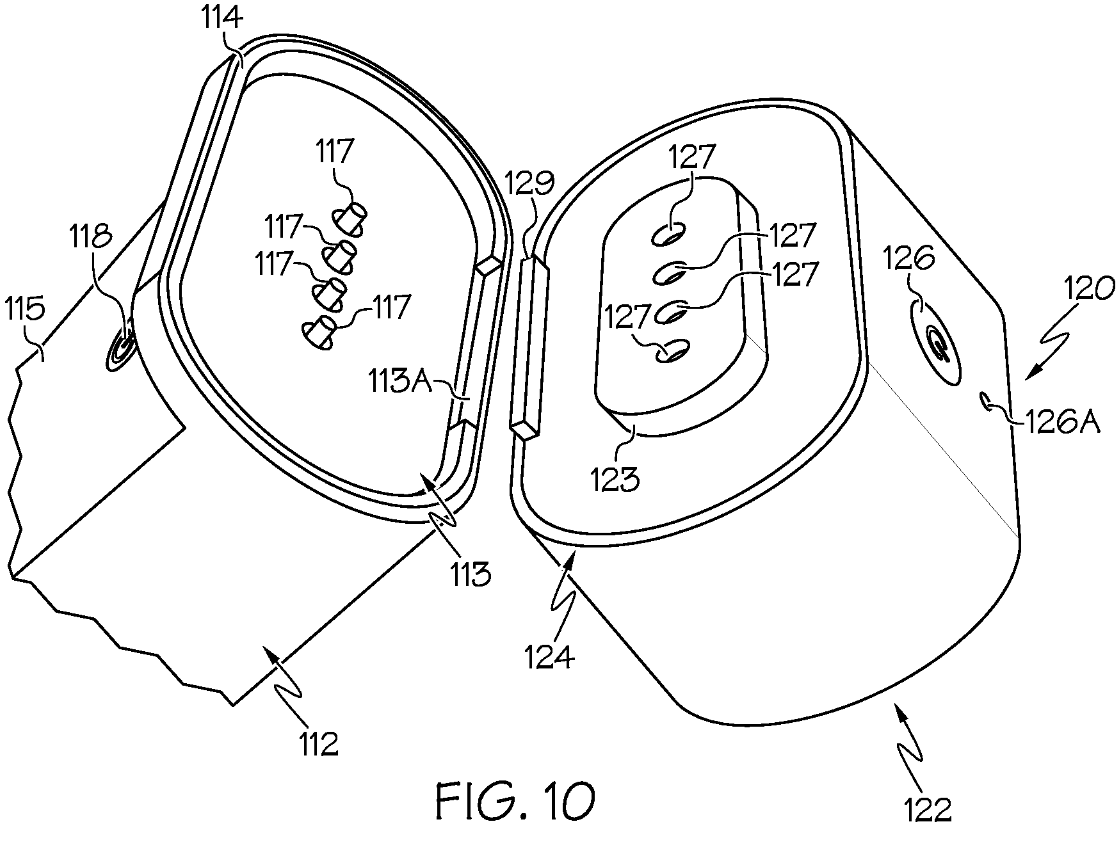
FIG. 10 shows a partial perspective view of an interface between a handle assembly and a lighting assembly of the solar-powered lighting device of FIG. 1, in accordance with some aspects of the present disclosure.

Referring back to FIG. 8, the lighting assembly 120 may further include an electrical interface at the proximal end 124. In the example shown, the electrical interface includes one or more electrical contacts 127 positioned on the proximal end 124, such as on the extension 123. The one or more electrical contacts 127 may be configured to electrically couple the lighting assembly 120 with the handle assembly 110 or the mounting assembly 130. As seen in FIG. 10, the handle assembly 110 may include a corresponding electrical interface at the distal end 114 that is configured to mate with the electrical interface of the lighting assembly 120 when the distal end 114 is coupled to the proximal end 124 of the lighting assembly 120.

In the example shown, the electrical interface of the handle assembly 110 may include one or more electrical pins 117 positioned on the distal end 114. The one or more electrical pins 117 may be configured to align with and contact the electrical contacts 127 when the distal end 114 of the handle assembly 110 is attached to the proximal end 124 of the lighting assembly 120, thereby electrically coupling the handle assembly 110 to the lighting assembly 120. Accordingly, power generated by the solar panel 119 and stored in the rechargeable battery of the handle assembly 110 may be transferred to the lighting assembly 120 via the connection between the electrical pins 117 and the electrical contacts 127.

Still referring to FIG. 10, the handle assembly 110 may include an engagement interface at the distal end 114 for attaching the handle assembly 110 to the proximal end 124 of the lighting assembly 120. As described above, the lighting assembly 120 may include extension 123 and the mounting assembly 130 may include aperture 133 sized and shaped to receive the extension 123. The handle assembly 110 may include an aperture 113 at the distal end 114 that is sized, shaped, and configured to receive the extension 123 for facilitating engagement between the handle assembly 110 and the lighting assembly 120. The engagement interface of the handle assembly 110 may further include a slot 113A that is sized and shaped to receive the protrusion 129 to facilitate coupling the handle assembly 110 to the lighting assembly 120. Additionally or alternatively, the distal end 114 of the handle assembly 110 may include one or more magnets that are configured to mate with one or more magnets of the proximal end 124 of the lighting assembly 120 to facilitate engagement between the handle assembly 110 and the lighting assembly 120. It should be appreciated that, in the example shown, the lighting assembly 120 is attachable to one of the handle assembly 110 or the mounting assembly 130 at once, and the mounting assembly 130 is attachable to one of the handle assembly 110 or the lighting assembly 120 at once. The handle assembly 110 is simultaneously attachable to the lighting assembly 120 and the mounting assembly 130.

Figure 11:
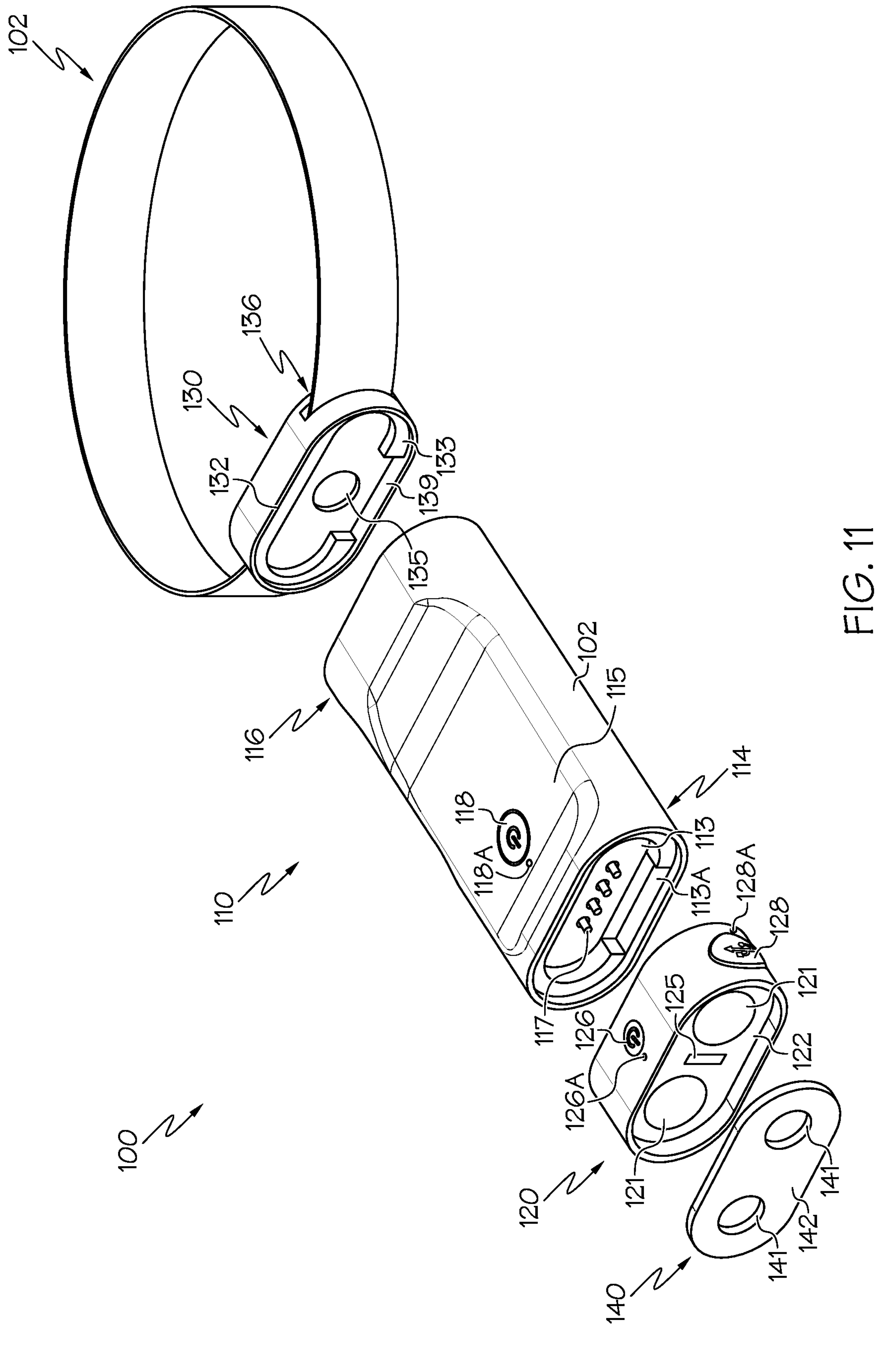
FIGS. 11 and 12 show perspective views of the solar-powered lighting device of FIG. 1 in a disassembled state, in accordance with some aspects of the present disclosure.
Figure 12:
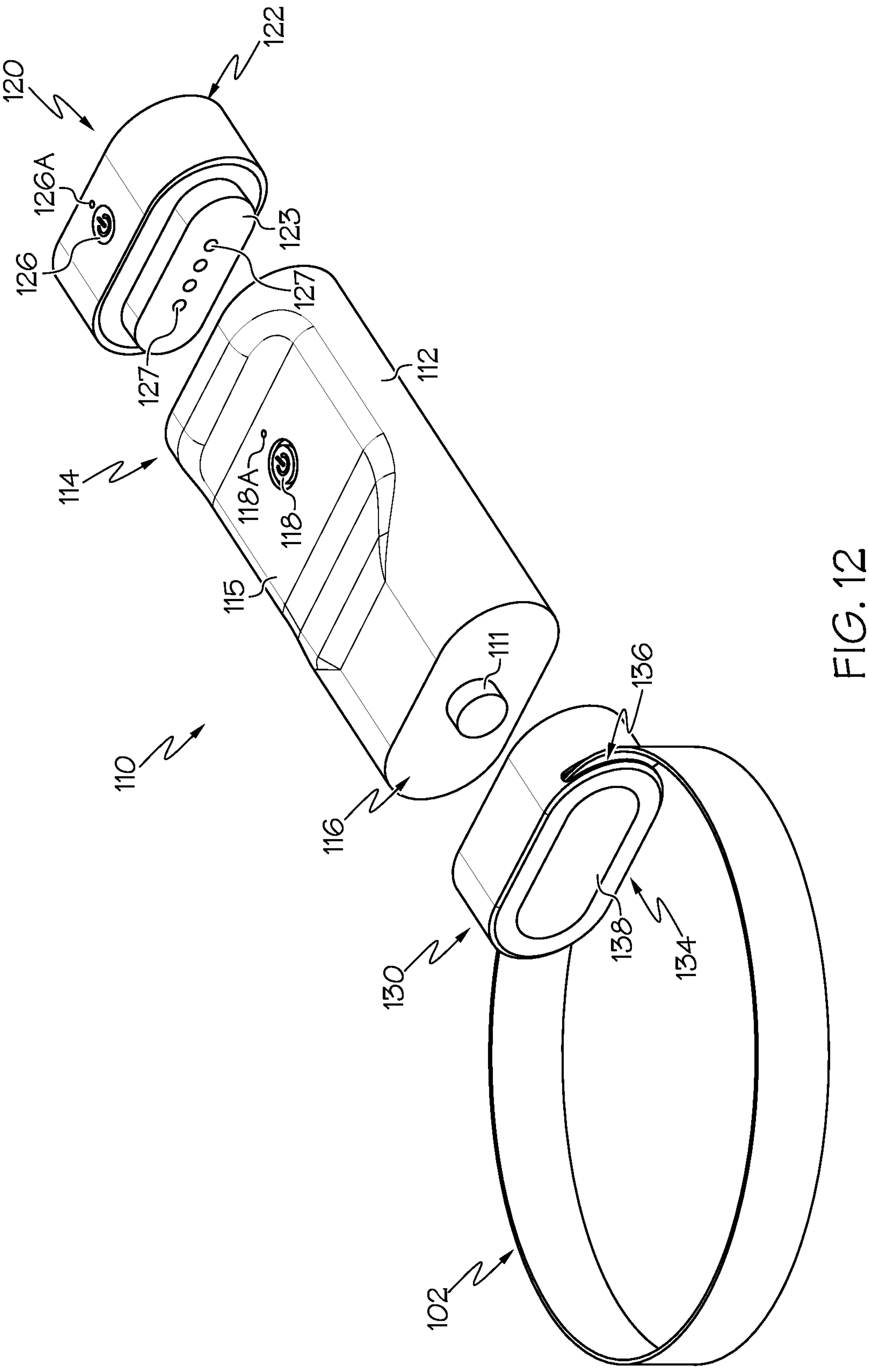

FIGS. 11-12 illustrate the lighting device 100 in a disassembled configuration (e.g., the handle assembly 110, the lighting assembly 120, and the mounting assembly 130 being decoupled or detached from one another). The mounting assembly 130 is depicted coupled to a fastening mechanism 102 received through the one or more slots 136. In this example, the fastening mechanism 102 includes an adjustable strap suitable for engaging a body part (e.g. hand, wrist, head, etc.) of the user. As best seen in FIG. 12, the engagement interface of the handle assembly 110 at the proximal end 116 may include a protrusion 111 that is sized, shaped, and configured to engage the second aperture 135 (FIG. 11) of the mounting assembly 130 for coupling the handle assembly 110 thereto.

FIGS. 13-14 illustrate exemplary configurations of the lighting device 100. FIG. 13 shows the lighting device 100 in a first, assembled configuration with each of the handle assembly 110, the lighting assembly 120, and the mounting assembly 130 coupled to one another along their respective engagement interfaces. In the first configuration, the lighting device 100 may have the form of a flashlight that is configured to be manually grasped by a user 10, such as a hand of the user 10. As described above, the body 112 and/or the user interface 115 may be sized, shaped, and configured to facilitate controlling the lighting device 100 with a user's hand positioned thereon. Further, the fastening mechanism 102 may be configured to wrap around a wrist of the user 10 to secure and/or suspend the lighting device 100 thereto.

In this exemplary first configuration, the user 10 may release manual control of the lighting device 100 while maintaining possession with the fastening mechanism 102 coupled to the body of the user 10 via the mounting assembly 130. The first configuration depicted in FIG. 13 may be convenient for storage of the lighting device 100 when not in use, or for charging. The user 10 may hold or wear the fastening mechanism 102 in a manner providing ease of access. In the first configuration, the distal end 122 of the lighting assembly 120 (i.e., the light-emitting surface) may face distally from the hand of the user 10 and be selectively positioned upon movement of the handle assembly 110 by the user 10. In this instance, the one or more light sources 121, 125 may be actuated via the actuator 118 and/or the actuator 126 using the electrical power stored in the rechargeable battery of the handle assembly 110 and/or the lighting assembly 120. Further, the solar panel 119 may face outward from the hand of the user 10 and be suitable for recharging the lighting device 100 during use by exposing the solar panel 119 to the sun or artificial light.

FIG. 14 shows the lighting device 100 in a second, assembled configuration with the lighting assembly 120 coupled directly to the mounting assembly 130 along the respective engagement interfaces. In this configuration, the lighting device 100 does not include the handle assembly 110. In this exemplary second configuration, the lighting device 100 may have the form of a headlamp that is configured to be positioned along the body of a user 10, e.g., a head of the user 10. As described detail above, the mounting assembly 130 (and particularly the proximal end 134 and/or the interface surface 138) may be sized, shaped, and configured to facilitate positioning the lighting device 100 against the head of the user 10. In this exemplary configuration, the interface surface 138 may provide a headrest for the user 10. Further, the fastening mechanism 102 may be configured to wrap around the head of the user 10 to secure and/or suspend the lighting device 100 thereto.

In this exemplary configuration illustrated in FIG. 14, the user 10 may use the lighting device 100 to illuminate the area ahead, allowing the user to freely utilize one or more hands while maintaining possession and control of the lighting device 100 with the fastening mechanism 102 coupled to the head of the user 10. The lighting device 100 is shown in a configuration convenient also for storage when not in use, wherein the fastening mechanism 102 is arranged on the user 10 in a manner providing ease of access. In the second configuration, the distal end 122 of the lighting assembly 120 (i.e. the light-emitting surface) may face distally from the head of the user 10. In this configuration, the one or more light sources 121, 125 may be actuated via the actuator 126 (see FIG. 7B) using the electrical power stored in the rechargeable battery of the lighting assembly 120. Further, the handle assembly 110 (not used in this configuration of the lighting device 100) may be stored and/or positioned in a separate location relative to the lighting assembly 120 and the mounting assembly 130, and in such a manner so as to allow the solar panel 119 to be exposed to the sun or artificial light for recharging the rechargeable battery while the lighting device 100 is used in the second configuration.

It is intended that the specification and examples be considered as exemplary only, with a true scope and spirit of the present disclosure being indicated by the following claims.

What is claimed is:

1. A portable solar-powered lighting device, comprising:

a handle assembly including a rechargeable battery and a solar panel electrically connected to the rechargeable battery;

a mounting assembly selectively attachable to a proximal end of the handle assembly;

and a lighting assembly selectively attachable to a distal end of the handle assembly, the lighting assembly including at least one light source;

wherein the device has a first configuration wherein the handle assembly is coupled to each of the lighting assembly and the mounting assembly, the lighting assembly being configured to emit light from the at least one light source using current generated by the solar panel and transferred to the lighting assembly via the rechargeable battery of the handle assembly while in the first configuration, wherein the proximal end of the handle assembly includes a first engagement interface and a distal end of the mounting assembly includes a second engagement interface that mates with the first engagement interface for coupling the mounting assembly to the handle assembly in the first configuration, wherein the distal end of the handle assembly includes a third engagement interface and a proximal end of the lighting assembly includes a fourth engagement interface that mates with the third engagement interface for coupling the lighting assembly to the handle assembly in the first configuration, wherein the device has a second configuration wherein the proximal end of the lighting assembly is coupled to the distal end of the mounting assembly, and the handle assembly is unattached to the lighting assembly and the mounting assembly, and wherein the second engagement interface includes a mating feature complementary to a mating feature of each of the first engagement interface and the fourth engagement interface, the mating feature comprising at least one protrusion, aperture, or magnet.

2. The device of claim 1, wherein the second engagement interface includes a mating feature complementary to a mating feature of each of the first engagement interface and the fourth engagement interface, the mating feature comprising at least one protrusion, aperture, or magnet.

3. The device of claim 1, wherein the third engagement interface and the fourth engagement interface include electrical contacts configured to electrically couple the handle assembly to the lighting assembly.

4. The device of claim 1, wherein the device includes a universal serial bus (USB) connector that is configured to couple an external electronic device to the rechargeable battery while the device is in the first configuration, to transfer power from the rechargeable battery to the external electronic device using current generated by the solar panel and stored in the rechargeable battery.

5. The device of claim 1, wherein the handle assembly includes a first actuator and the lighting assembly includes a second actuator, each of the first actuator and the second actuator being configured to independently actuate the lighting assembly to emit light from the at least one light source using current generated by the solar panel when the device is in the first configuration.

6. The device of claim 1, wherein the mounting assembly includes at least one slot for receiving a fastening mechanism.

7. The device of claim 6, wherein the fastening mechanism includes a flexible strap configured to engage a body part of a user.

8. The device of claim 7, wherein a proximal end of the mounting assembly includes a padded surface configured to at least partially inhibit movement of the mounting assembly relative to the body part of the user.

9. The device of claim 1, wherein the at least one light source includes a plurality of light-emitting diodes (LEDs).

10. A portable solar-powered lighting device, comprising:

a handle assembly including a rechargeable battery and a solar panel electrically connected to the rechargeable battery;

a mounting assembly selectively attachable to a proximal end of the handle assembly;

and a lighting assembly selectively attachable to a distal end of the handle assembly, the lighting assembly including at least one light source;

wherein the device has a first configuration wherein the handle assembly is coupled to each of the lighting assembly and the mounting assembly, the lighting assembly being configured to emit light from the at least one light source using current generated by the solar panel and transferred to the lighting assembly via the rechargeable battery of the handle assembly while in the first configuration, and wherein the lighting assembly includes a rechargeable battery that is electrically coupled to the rechargeable battery of the handle assembly when the device is in the first configuration.

11. The device of claim 10, wherein the lighting assembly is configured to charge the rechargeable battery of the lighting assembly using current generated by the solar panel and stored in the rechargeable battery of the handle assembly when the device is in the first configuration.

12. The device of claim 10, wherein the lighting assembly includes an actuator configured to actuate the lighting assembly to emit light from the at least one light source using current stored in the rechargeable battery of the lighting device when the lighting assembly is detached from the handle assembly in a second configuration of the device.

13. A portable solar-powered lighting device, comprising:

a handle assembly extending from a proximal end to a distal end, the handle assembly including a rechargeable battery and a solar panel positioned along an exterior of the handle assembly, the solar panel being electrically connected to the rechargeable battery;

a mounting assembly extending from a proximal end to a distal end, the distal end of the mounting assembly being selectively attachable to the proximal end of the handle assembly; and a lighting assembly extending from a proximal end to a distal end, the proximal end of the lighting assembly being selectively attachable to the distal end of the handle assembly, wherein the lighting assembly includes at least one light source configured to emit light through the distal end of the lighting assembly;

wherein the device has a first configuration wherein the handle assembly is coupled to each of the lighting assembly and the mounting assembly, and the at least one light source is electrically coupled to the rechargeable battery of the handle assembly when the device is in the first configuration;

wherein the lighting assembly emit lights from the at least one light source using current generated by the solar panel and stored in the rechargeable battery when the device is in the first configuration, and wherein the proximal end of the lighting assembly includes at least one protrusion complementary to an aperture of the distal end of the handle assembly and complementary to an aperture of the distal end of the mounting assembly.

14. The device of claim 13, wherein the device has a second configuration wherein the proximal end of the lighting device is coupled to the distal end of the mounting assembly, and the handle assembly is not coupled to either of the lighting device or the mounting device.

15. A portable solar-powered lighting device, comprising:

a handle assembly including a rechargeable battery and a solar panel that is electrically connected to the rechargeable battery;

a mounting assembly selectively attachable to the handle assembly, the mounting assembly coupled to a flexible strap; and a lighting assembly selectively attachable to the handle assembly, the lighting assembly including a rechargeable battery and at least one light source;

wherein the device has a first configuration wherein the handle assembly is coupled to each of the lighting assembly and the mounting assembly, the lighting assembly being configured to emit light from the at least one light source using current generated by the solar panel and transferred to the lighting assembly via the rechargeable battery of the handle assembly; and wherein the device has a second configuration wherein the lighting assembly is coupled to the mounting assembly and not coupled to the handle assembly, the lighting assembly being configured to emit light from the at least one light source using current transferred to the lighting assembly via the rechargeable battery of the lighting assembly.

16. The device of claim 15, wherein the device has the form of a flashlight in the first configuration and the form of a headlamp in the second configuration.

* * * * *